3,069,314
SNAKE REPELLENT
James H. Jenkins, 655 Riverhill Drive, Athens, Ga.
No Drawing. Filed Dec. 29, 1960, Ser. No. 79,142
8 Claims. (Cl. 167—46)

This invention relates to a new and useful pesticide composition which is primarily intended for use as a snake repellent.

So far as I am aware, there have been no compositions intended for the specific purpose of repelling snakes. At the same time, in many parts of the world snakes are a serious problem, and it is desired to find a means of repelling them from a treated area. It is estimated that there are approximately 500,000 cases of snake bite per year, throughout the world, and approximately 50,000 resulting deaths. In the United States alone there are an estimated 50,000 cases of snake bite per year resulting in 10 to 20 deaths.

The primary object of my invention is to provide a composition which will effectively repel snakes.

It is also an object of my invention to provide a composition which will kill, on contact, such occasional snakes as may, for one reason or another, not be repelled by the same.

In addition, it is an object of my invention to provide a snake repellent composition which also will repel mammals which otherwise might consume the same.

The composition of my invention has been particularly developed for application to fields, lawns and shrubbery to drive away snakes, and to eliminate any snakes which inadvertently or otherwise come into contact with the material. While tests, to be described, have shown that the composition of my invention is extremely effective in repelling and deterring snakes from following a prey scent trail, and in killing snakes by simple application, it is relatively safe if used according to directions and if ordinary precautions are taken.

Briefly stated, I have discovered that the combination of a lachrymator and an ammonia generator provides an unexpectedly effective snake repellent.

As a lachrymator, I can use any one of several materials, namely: benzoyl chloride; benzoyl bromide; chloro-aceto-phenone; and, phenol-carbyl-amine chloride.

The ammonia generator should decompose and release ammonia upon exposure to the ambient atmosphere. To be effective, it should decompose at substantially no higher than 60° C. Ammonium carbonate, is an effective and practical ammonia generating material for my purposes. It slowly releases ammonia when taken from an air tight container, and therefore becomes effective upon exposure of the composition to air.

To enhance the repelling effect, I also preferably use musk from mink, civet cat, weasel, badger, skunk or any other, natural enemy of snakes. In lieu of musk, I can use n-amyl mercaptan.

In addition, for toxicity, to kill such snakes as may not be repelled and come into contact with the composition, I preferably include one or more chlorinated hydrocarbons selected from dieldrin [containing not less than 85% of 1,2,3,4,10,10-hexachloro-6,7,-epoxy-1,4,4a,5,6,7, 8,8a-octahydro-1,4-endo,exo-5,8 dimethanonaphthalene], aldrin [1,2,3,4,10,10-hexachloro-1,4,4a,5,8,8a-hexahydro-1,4-endo,exo - 5,8 - dimethanonaphthalene], heptachlor [$C_{10}H_7Cl_7$-1,4,5,6,7,8,8,heptachloro-3a,4,7,7a tetrahydro-4,7 methanoindene], and toxaphene [chlorinated camphene $C_{10}H_{10}Cl_8$].

For toxicity, I also preferably include nicotine sulfate [$(C_{10}H_{14}N_2)_2$-$H_2SO_4$] and/or nicotine alkaloid [3-(1-methyl-2-pyrrolidyl) pyridene].

For repelling mammals, which otherwise might consume or be destroyed by the composition, I include toxaphene, nicotine sulfate and/or nicotine alkaloid.

A presently preferred formulation of my snake repellent composition is prepared in the following manner, the percentages being by weight.

A portion of the ingredients are added by spraying a water solution of these ingredients onto an attapulgite clay granular carrier. The formulation of this water solution is as follows:

(A) Water solution—

| | Percent |
|---|---|
| (1) Water | 27.20 |
| (2) Urea | 16.66 |
| (3) Nicotine alkaloid | 16.14 |
| (4) 40% nicotine sulphate | 40.00 |
| | 100.00 |

Charge (1) and dissolve (2). Add (3) with stirring; then add (4).

After the addition of the water solution, the following formulation made up of the oil soluble ingredients is sprayed onto the granular carrier. The formulation and preparation of this oil solution is as follows:

(B) Oil solution—

| | Percent |
|---|---|
| (1) Oil (Hi-Sol-100) | 38.68 |
| (2) Dieldrin | 15.00 |
| (3) Heptachlor (Tech 73%) | 10.00 |
| (4) Texaphene (90% solution in 10% xylol) | 16.64 |
| (5) Petroleum jelly | 8.77 |
| (6) Civet musk | 2.14 |
| (7) Benzoyl chloride | 8.77 |
| | 100.00 |

Charge (1) + (2) + (3) + (5). Heat with stirring to 70° C. (160° F.) until all solids dissolve. Turn off heat and add (4). Allow to cool to room temperature. Add (6) then (7) with stirring.

The above water and oil solutions are combined with the granular carrier and the ammonium carbonate into the completed formulation as shown below:

(C) Complete formulation—

| | Percent |
|---|---|
| (1) Attapulgite granule 15/30 RVM | 68.70 |
| (2) Water solution—(A) | 6.00 |
| (3) Oil solution—(B) | 22.00 |
| (4) Ammonium carbonate (powder) | 3.30 |
| | 100.00 |

Charge mixer with (1). While mixing spray in all solution A. (Clean sprayer with water.) Spray in all solution B. (Clean sprayer with water.) Add (4) in powdered form. Mix minimum time. Draw off and package. The spray solutions (A and B) should be added as rapidly as possible consistent with uniform distribution. Ribbon mixing time of the clay granules should be held to a minimum to decrease the formation of fines and dust.

Urea has been added to the formula in the amount of 1.0% to neutralize the acid cites present on the attapulgite clay. This is necessary to avoid premature decomposition of the chlorinated insecticides in this formulation which would be catalyzed by the acid clay. Both the nicotine alkaloid and the 40% nicotine sulphate shall not be mixed with the benzoyl chloride. A chemical reaction occurs between the nicotine components and benzoyl chloride to form a tar-like product and the original components would be destroyed. It is recommended that the benzoyl chloride be added as the last ingredient to the solution at room temperature, and the entire solution drummed after a minimum amount of agitation.

Test Results

Tests Nos. 1 and 2 were made using the following formulation, assuming 1000 grams of material:

333 grams of 10% dieldrin granular
166 grams of 10% heptachlor granular
333 grams of 10% toxaphene granular
33 grams of granulated ammonium carbonate
60 grams attapulgite clay granules
25 grams (equivalent to 25 cc.) of 40% nicotine sulfate
10 grams (10 cc.) of technical grade nicotine alkaloid
20 cc. of benzoyl chloride
20 grams of petroleum jelly
5 cc. of musk.

Test No. 3 was made using the preferred formulation, but with the benzoyl chloride and ammonium carbonate omitted.

Test No. 1

Ten boxes were prepared, 2½ feet long and 6 inches square, open at one end. All of these boxes were identical, and were placed in a small concrete, snake proof room. Half of the boxes were kept as controls, and in the remaining boxes a small amount of snake repellent, just enough to dust the floor of the box, was added.

From three to nine snakes, depending upon availability, were introduced to this room along with water and some food. The snakes were placed behind the boxes and it was necessary for them to come around to the front of the room before they could enter any of the boxes.

Most entries were made during the daytime, since this was their only real escape from the light and snakes prefer dark corners if possible.

The results of the entries were compiled over a forty-eight day period. In all, there were 273 observations. During this time 38 snakes entered the boxes without repellent, and nine snakes entered boxes which contained the repellent. It is also important to note that, of the nine entries into the boxes containing the repellent, at least five of these snakes died within forty-eight hours. During the first 17 days of the test only one entry was made into a box containing the repellent.

On two occasions while visiting the room, the snakes were scared into entering treated boxes. However, they came out rapidly if the observer remainder quiet.

The snake repellent was renewed in the boxes once every twenty days, and there was little doubt in the minds of any of the men checking these snakes as to the repellent qualities of the repellent being tested.

Test No. 2

Three boxes similar in make-up to green house hot beds, four feet wide and 16 feet long with no obstructions in the center, were constructed on land. The tops were screened to keep the snakes from escaping, but other than this there were no restrictions for snake movement.

Box No. 3 contained no repellent, and was used as a control in an effort to determine whether or not snakes moved in captivity freely within a container of this size.

The snakes were checked twice per day in all boxes, and the following observations were made:

BOX NO. 3

(No repellent)

| Percent of space alloted to respective sections | No. of snakes observed in respective sections | Percent of snakes found in respective sections |
|---|---|---|
| 37.5% Left Side Section | 25 | 40.3 |
| 25% Center Section | 16 | 25.8 |
| 37.5% Right Side Section | 21 | 33.8 |
| Total Observations | 62 | |

Note from the above table that the snakes were almost equally distributed throughout the checking period, indicating that snakes do move freely in captivity, especially if the boxes are large enough.

BOX NO. 2

(Repellent in one side section only)

Box No. 2 was checked twice a day, as were all boxes, and ninety observations were made of the four snakes in that box. Eighty-eight observations were made with the snakes out of the repellent, and two observations were made with the snakes in the repellent. This results in 97.8 percent of the snakes being out of the repellent and 2.2% in the repellent. During this period of time, one snake died as a result of being in the repellent, one was consumed by a larger snake, and one is unaccounted for but probably was eaten by a larger snake.

It is of interest to note that the center section of Box No. 2, which contained no repellent, but did contain water, took up 25% of the space but only 18.8% of the observations were made in this particular section. That side section that contained no repellent and was furtherest away from the repellent accounted for 79% of the observations. This would indicate that the repellent is effective at a further distance than was generally expected.

BOX NO. 1

(Repellent in one side section only)

Box No. 1 contained six snakes over a period of three weeks time. There were 98 observations made. 88 of these, or 89.8%, were out of the repellent, and 10, or 10.2%, were in the repellent. Three of the six snakes died. Two of these were garden snakes, and one a rat snake.

The time lapse before the first snake was observed in the repellent was ten days. Of the ten observations made of snakes in the repellent, five were made on one particular rat snake in which there was also observed substantial nerve damage. In my opinion there would be enough nerve damage to seriously interfere with the judgment of the snake and the olfactory senses were probably damaged. This is a condition that would not exist except where snakes were restrained in one particular location.

During the observation period, 79 observations were made on the side section furtherest from the repellent, and only 9 were made in the center section nearest the repellent, again indicating that there is some extension of the repellent action from its immediate section.

Summary of Results.—Test No. 2

The final results of the combined totals of observations in this test were that 188 observations were made over a 28 day period with a total of 176 of these observed outside of the repellent and 12 inside of the repellent. This means that only 6.4% of the snakes were in the repellent while 93.6% of the snakes were out of the repellent.

Test No. 3

This was a fourteen day test of material which eliminated the lachrymator and the ammonia generator from the original formula, and used four boxes of snakes, and divided them up in an effort to get a complete comparison under various conditions. In two of the boxes there was only one snake, in box 3 seven snakes were used, and in box 4 two snakes of a poisonous variety were used. The boxes were similar to those described in Test No. 2.

All of the boxes were divided up, so that 37% of the space is covered with repellent. The other portion of the box did not contain the repellent, and the snakes were free to move between the space with the repellent and the portion without the repellent.

In box No. 1, containing one king snake, the snake was in the repellent covered area on 23% of the observations. In box No. 2, containing a black snake, the snake was in the repellent covered area on 50% of the observations.

In box No. 3, containing seven non-poisonous snakes, one or more snakes were observed in the repellent covered area on 24.5% of the observations.

In box No. 4 containing two rattlesnakes, one or more snakes were observed in the repellent covered area on 23% of the observations.

These observations compare very unfavorably with Tests No. 1 and 2, and clearly demonstrate the efficacy of the lachrymator-ammonia generator combination as a snake repellent.

It will be observed that, in the above-stated formulation, more than one toxic and mammal repelling material is used. The several toxic agents are used because some snakes might tolerate certain individual ingredients, used alone. Further, there is a definite and pronounced synergistic action produced when these ingredients are combined in the above formulations. It is my observation that the total material is far more potent than any ingredient taken separately, and that heptachlor, for example, is perhaps as much as six times more effective in combination, than when used alone.

What I claim as new is:

1. A snake repellent composition consisting essentially of a lachrymator, and a material which generates ammonia upon exposure to atmosphere.

2. A snake repellent composition as set forth in claim 1 together with a member selected from the group consisting of musk and n-amyl mercaptan.

3. A snake repellent composition as set forth in claim 1, wherein the ammonia generator consists essentially of ammonium carbonate.

4. A snake repellent composition as set forth in claim 1, wherein the lachrymator is selected from the group consisting of benzoyl bromide, benzoyl chloride, chloro-aceto-phenone, and phenol-carbyl-amine chloride.

5. A snake repellent composition as set forth in claim 1, together with a chlorinated hydrocarbon selected from the group consisting of dieldrin, aldrin, heptachlor and toxaphene.

6. A snake repellent composition as set forth in claim 1, together with toxic nicotine selected from the group consisting of nicotine sulfate and nicotine alkaloid.

7. A snake repellent composition as set forth in claim 1, together with a mammal repellent selected from the group consisting of toxaphene, nicotine sulfate and nicotine alkaloid.

8. A snake repellent composition consisting essentially of a lachrymator selected from the group consisting of benzoyl bromide, benzoyl chloride, chloro-aceto-phenone, and phenol-carbyl-amine chloride, a material which generates ammonia upon contact of the composition with air, a material selected from the group consisting of musk and n-amyl mercaptan, a chlorinated hydrocarbon selected from the group consisting of dieldrin, aldrin, heptachlor and toxaphene, and a nicotine selected from the group consisting of nicotine sulfate and nicotine alkaloid.

References Cited in the file of this patent

Welch: Summary of Deer Control Studies, Wildlife Research Lab. Devert, Colorado, June 1948, 8-page publication, pages 4 and 5 relied upon.

Dewitt: Relationship Between Chemical Structure and Rat Repellency, Review No. 5, National Research Council, Washington, D.C., 1953, pages 54, 56 and 119.

Hanna: Handbook of Agricultural Chemicals," 2nd ed., January 1959, pub. by Hanna, Rt. 1, Box 210, Forest Grove, Oregon, U.S.A., pages 260, 284 and 298.